United States Patent
Lynch

(10) Patent No.: US 9,883,554 B2
(45) Date of Patent: Jan. 30, 2018

(54) COMMUTATION CIRCUIT FOR SEQUENTIAL LINEAR LED DRIVERS

(71) Applicant: Microchip Technology Incorporated, Chandler, AZ (US)

(72) Inventor: Scott Lynch, Half Moon Bay, CA (US)

(73) Assignee: Microchip Technology Inc., Chandler, AZ (US)

( * ) Notice: Subject to any disclaimer, the term of this patent is extended or adjusted under 35 U.S.C. 154(b) by 0 days.

(21) Appl. No.: 15/276,253

(22) Filed: Sep. 26, 2016

(65) Prior Publication Data

US 2017/0094733 A1  Mar. 30, 2017

Related U.S. Application Data

(60) Provisional application No. 62/234,081, filed on Sep. 29, 2015.

(51) Int. Cl.
   *H05B 33/08* (2006.01)

(52) U.S. Cl.
   CPC ....... *H05B 33/0812* (2013.01); *H05B 33/083* (2013.01)

(58) Field of Classification Search
   CPC ............ H05B 33/0812; H05B 33/0836; H05B 37/036
   See application file for complete search history.

(56) References Cited

U.S. PATENT DOCUMENTS

| | | | | |
|---|---|---|---|---|
| 7,081,722 B1* | 7/2006 | Huynh | ............... | H05B 33/0818 |
| | | | | 315/185 S |
| 8,164,276 B2* | 4/2012 | Kuwabara | ............ | H05B 33/083 |
| | | | | 315/185 R |
| 9,066,392 B2* | 6/2015 | Lee | ..................... | H05B 33/0809 |
| 9,144,123 B2* | 9/2015 | Jeong | ................... | H05B 33/083 |
| 9,144,128 B2* | 9/2015 | Shin | ..................... | H05B 33/083 |
| 9,247,593 B2* | 1/2016 | Wlodarczyk | ....... | H05B 33/0809 |
| 9,247,599 B2* | 1/2016 | Lee | ..................... | H05B 33/083 |
| 9,265,103 B2* | 2/2016 | Lynch | ................ | H05B 33/0818 |
| 9,439,255 B2* | 9/2016 | Lin | ......................... | H05B 37/02 |
| 9,497,812 B2* | 11/2016 | Lee | ..................... | H05B 33/083 |
| 2011/0084619 A1* | 4/2011 | Gray | .................. | H05B 33/0824 |
| | | | | 315/185 R |
| 2011/0273102 A1 | 11/2011 | van de Ven et al. | | |
| 2012/0229030 A1* | 9/2012 | Moskowitz | ........ | H05B 33/0809 |
| | | | | 315/122 |
| 2012/0262075 A1* | 10/2012 | Lynch | ................ | H05B 33/0818 |
| | | | | 315/192 |
| 2012/0280622 A1 | 11/2012 | Jeong et al. | | |

(Continued)

FOREIGN PATENT DOCUMENTS

EP  2670219 A2  4/2013

*Primary Examiner* — Jason M Crawford
(74) *Attorney, Agent, or Firm* — Burr & Forman LLP; Ryan M. Corbett

(57) ABSTRACT

A sequential linear LED driver circuit is provided. The sequential linear LED driver circuit may include a plurality of current sinks, wherein each of the plurality of current sinks is configured to be coupled to a segment of a string of light-emitting diodes (LEDs), and a voltage divider that generates a plurality of reference voltages, wherein each of the plurality of reference voltages is applied to a respective current sink of the plurality of current sinks. The output of each current sink of the plurality of current sinks may be connected at a summing node.

7 Claims, 4 Drawing Sheets

(56) References Cited

U.S. PATENT DOCUMENTS

| | | | | |
|---|---|---|---|---|
| 2012/0299489 | A1* | 11/2012 | Sakuragi | H05B 33/083 |
| | | | | 315/187 |
| 2013/0169160 | A1* | 7/2013 | Kim | H05B 37/02 |
| | | | | 315/122 |
| 2013/0320868 | A1* | 12/2013 | Kim | H05B 33/083 |
| | | | | 315/186 |
| 2014/0239824 | A1* | 8/2014 | Li | H05B 33/0812 |
| | | | | 315/185 R |
| 2014/0300274 | A1* | 10/2014 | Acatrinei | H05B 33/0815 |
| | | | | 315/85 |
| 2015/0382414 | A1* | 12/2015 | Lynch | H05B 33/0812 |
| | | | | 315/187 |

* cited by examiner

COMMUTATION CIRCUIT FOR SEQUENTIAL LINEAR LED DRIVERS

CROSS-REFERENCE TO RELATED APPLICATION

This application claims the benefit of U.S. Provisional Patent Application No. 62/234,081, filed on Sep. 29, 2015, which is incorporated herein by reference in its entirety.

TECHNICAL FIELD

The present disclosure relates generally to a sequential linear LED driver circuit.

SUMMARY

A sequential linear LED driver, or "driver" for short, provides means for driving an LED string from a rectified AC line voltage. The driver lights the LED string either in part or in full depending on the magnitude of the rectified voltage. The driver includes a set of linear current sinks for coupling to the LED string and to taps located within the LED string. Accordingly, the LED string is divided into a set of LED segments.

The division of the LED string into a set of LED segments allows the driver to light the LED string in part or in full. As the rectified AC voltage rises or falls, a respectively increasing or decreasing number of segments is energized by commuting current flow from one current sink to an adjacent current sink. The driver generally enables the current sink which maximizes the number of LED segments that can be energized with a given magnitude of the rectified AC line voltage, thereby maximizing utilization of the LED string and minimizing power dissipation within a current sink.

However, a problem occurs when the commutation of current between current sinks is not timed properly. Poor timing results in spikes or gaps in the current drawn from the AC line, thereby potentially generating excess electromagnetic interference (EMI). For example, the line current spikes upward when two adjacent current sinks briefly conduct current simultaneously, as shown in the left-most current waveform of FIG. 1. Similarly, the line current spikes downward when two adjacent current sinks briefly do not conduct during commutation, as shown in the right-most current waveform of FIG. 1. Accordingly, a circuit is needed, which enables a smooth commutation of the line current from one current sink to the next, as shown for example in the center current waveform of FIG. 1.

According to an aspect of one or more exemplary embodiments, there is provided a circuit that coordinates the commutation of current between two adjacent current sinks by forcing all current sink currents to pass through a summing node. The summing of all current sink currents facilitates smooth commutation of current between current sinks and results in an AC line current without spikes and gaps. According to one or more exemplary embodiments, the commutation circuit may rely only on the current sink currents for coordinating the commutation of the line current between current sinks. The commutation circuit according to one or more exemplary embodiments, may not need to rely on knowledge of the rectified AC line voltage or the voltage at the LED string taps, thereby avoiding improper timing due to voltage measurement inaccuracy. Furthermore, the cost of measuring and processing high voltages may be avoided.

According to one or more exemplary embodiments, a sequential liner LED driver circuit may include a plurality of current sinks, wherein each of the plurality of current sinks is configured to be coupled to a string of light-emitting diodes (LEDs) and to taps located within the LED string, and a voltage divider that generates a plurality of reference voltages, wherein each of the plurality of reference voltages is applied to a respective current sink of the plurality of current sinks. The output of each current sink of the plurality of current sinks may be connected at a summing node for establishing the sum of the currents flowing by way of the plurality of current sinks.

Each current sink may include a control amplifier having a reference or positive input terminal, a feedback or negative input terminal, an output terminal, and a field effect transistor (FET) having a gate terminal, a source terminal, and a drain terminal (or a bipolar transistor with like terminals). The output of the control amplifier of each current sink may be coupled to the gate terminal of the FET in the respective current sink. Each of the plurality of reference voltages may be applied to the reference terminal of the control amplifier of a respective current sink. The source terminal of each FET may be coupled to the feedback terminal of the control amplifier of the respective current sink. The drain terminal of each FET may be coupled to the LED string or a tap located within the LED string. The source terminal of each FET may be coupled to the summing node.

According to one or more exemplary embodiments, the reference terminal of each control amplifier may be connected to a first reference voltage. The feedback terminal of each control amplifier may be connected to one of the plurality of reference voltages. The feedback terminal of a first control amplifier of a first current sink may be coupled to the summing node. A first end of the voltage divider is coupled to the summing node, and a second end of the voltage divider is connected to ground. The sequential LED driver circuit may also include a resistor having a first end coupled to the summing node and a second end coupled to ground.

DETAILED DESCRIPTION OF EXEMPLARY EMBODIMENTS

Figure 1:
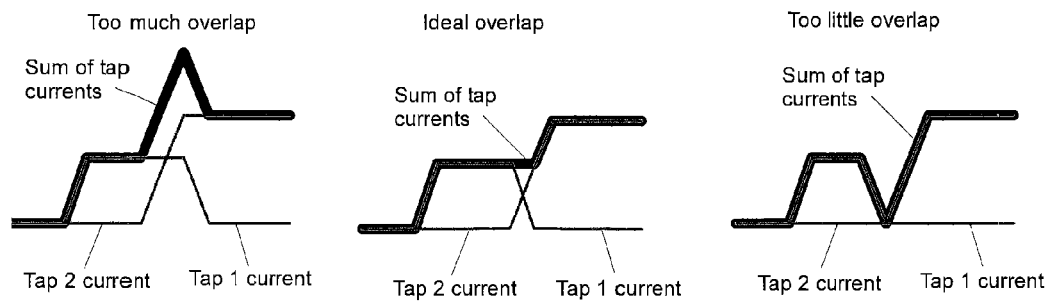
FIG. 1 illustrates a series of tap current waveform showing unacceptably high, ideal, and unacceptably low tap current in the tap current from one tap to another tap.

Reference will now be made in detail to the following exemplary embodiments, which are illustrated in the accompanying drawings, wherein like reference numerals refer to like elements throughout. The exemplary embodiments may be embodied in various forms without being limited to the exemplary embodiments set forth herein. Descriptions of well-known parts are omitted for clarity.

Figure 2:
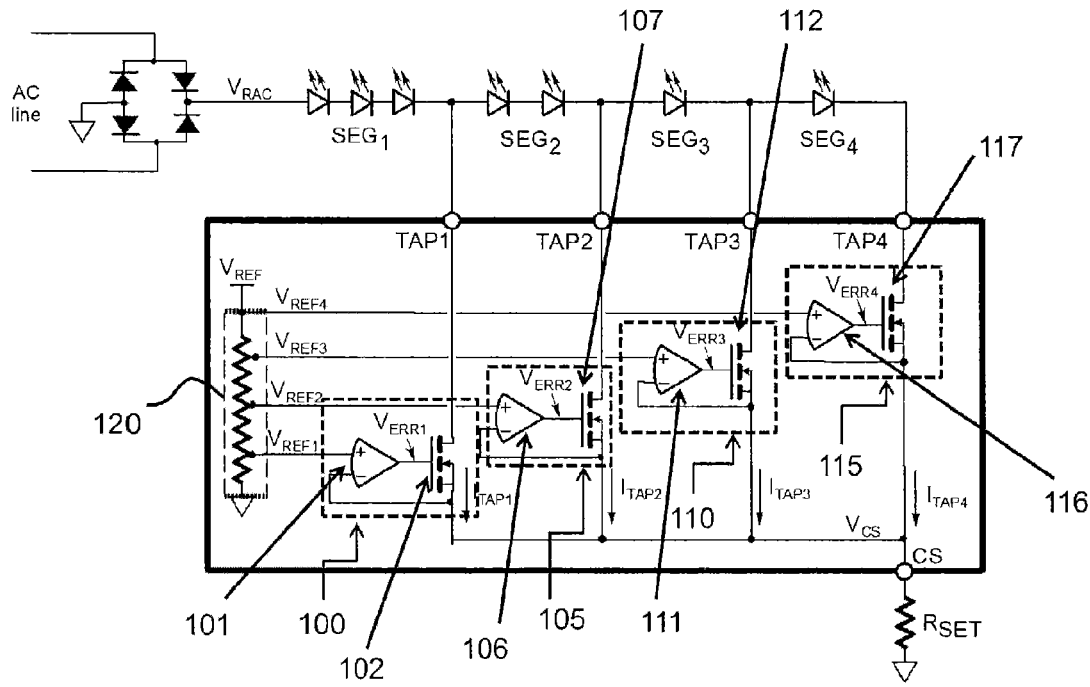
FIG. 2 illustrates a sequential linear LED driver circuit according to an exemplary embodiment.

FIG. 2 depicts a sequential linear LED driver circuit according to an exemplary embodiment. Referring to FIG. 2, the circuit according to the exemplary embodiment may include a first current sink 100, a second current sink 105, a third current sink 110, and a fourth current sink 115. Each of the current sinks may include a control amplifier and field effect transistor (FET). The reference input of each control amplifier may be connected to a resistive voltage divider 120. The control amplifiers may be connected to the resistive voltage divider 120 at various points, such that $V_{REF4} > V_{REF3} > V_{REF2} > V_{REF1}$, where $V_{REF4}$ is connected to the reference input of control amplifier 116 of fourth current sink 115, $V_{REF3}$ is connected to the reference input of control amplifier 111 of third current sink 110, $V_{REF2}$ is connected to the reference input of control amplifier 106 of second current sink 105, and $V_{REF1}$ is connected to the reference input of control amplifier 101 of first current sink 100. The output of each control amplifier 101, 106, 111, and 116 may be respectively connected to the gate terminals of FETs 102, 107, 112, and 117 of first current sink 100, second current sink 105, third current sink 110, and fourth current sink 115, respectively. The source terminals of FETs 102, 107, 112, and 117 may be connected to the feedback input of control amplifier 101, 106, 111, and 115, respectively. The drain terminal of each FET may be connected between two segments of an LED string. For example, the drain of FET 102 may be connected between a first segment of LEDs $SEG_1$ and a second segment of LEDs $SEG_2$. The drain of FET 107 may be connected between second segment of LEDs $SEG_2$ and a third segment of LEDs $SEG_3$. The drain of FET 112 may be connected between third segment of LEDs $SEG_3$ and a fourth segment of LEDs $SEG_4$. The drain of FET 117 may be connected to an output of the fourth segment of LEDs $SEG_4$. The sources of FETs 102, 107, 112, and 117 may be connected at to each other at a single summing node CS.

Figure 3:
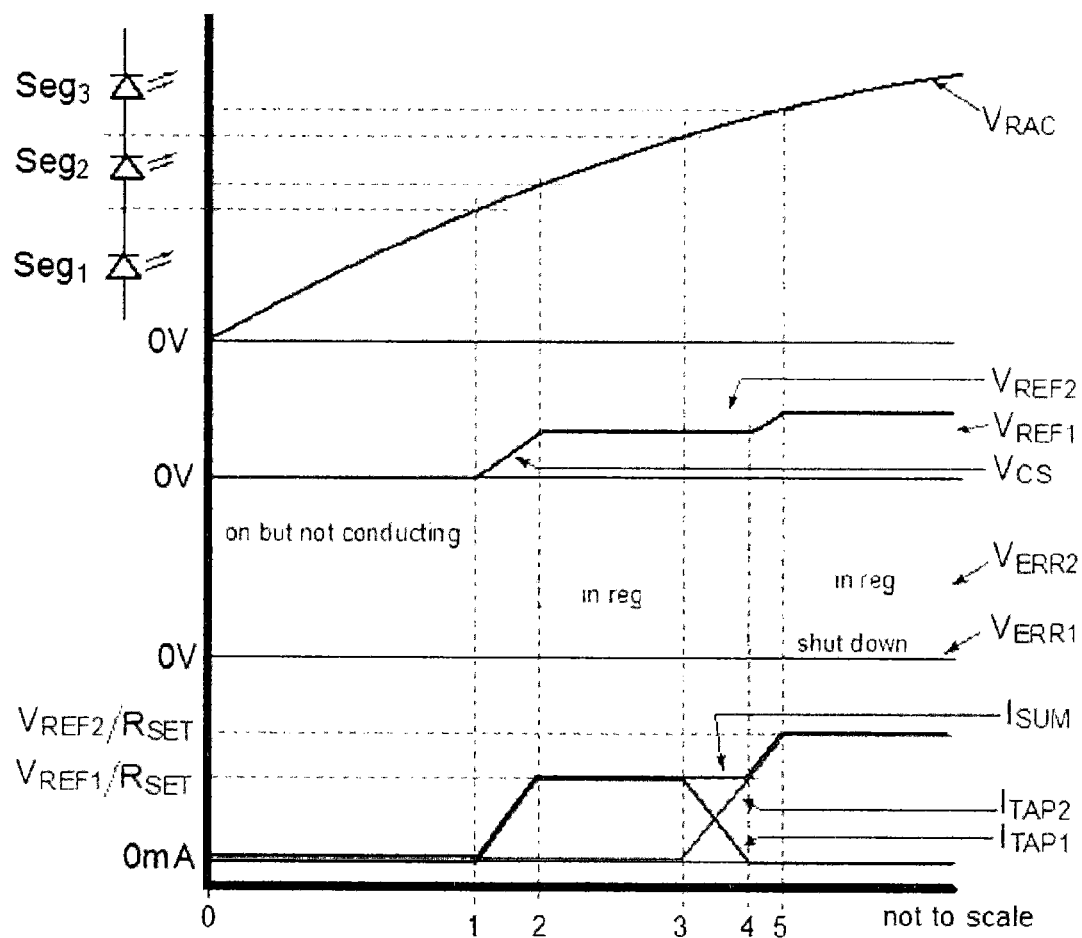
FIG. 3 illustrates a timing diagram showing the operation of the sequential linear LED driver circuit according to the exemplary embodiment of FIG. 2.

FIG. 3 depicts the operation of the circuit according to the exemplary embodiment of FIG. 2. At time 0, input voltage $V_{RAC}$ is equal to 0V, which is insufficient voltage to forward bias the first segment of LEDs $SEG_1$. At time 1, $V_{RAC}$ reaches a level which is sufficient to forward bias the first segment of LEDs $SEG_1$, but insufficient to enable current regulation. Going forward in time, the voltage $V_{CS}$ at the summing node CS begins to rise, as does the current sink current $I_{TAP1}$ through FET 102. At time 2, the first current sink 100 begins to regulate current as voltages $V_{CS}$ and $V_{REF1}$ are in approximate equilibrium.

At time 3, $V_{RAC}$ rises to the level which is sufficient to forward bias the second segment of LEDs $SEG_2$, causing current $I_{TAP2}$ to flow through FET 107. Current $I_{TAP2}$ increases the voltage $V_{CS}$ at the summing node CS. In response to the increased voltage $V_{CS}$, the first current sink 100 decreases the current $I_{TAP1}$ so that $V_{CS}$ and $V_{REF1}$ remain in approximate equilibrium. Current $I_{TAP2}$ increases at roughly the same rate at which current $I_{TAP1}$ decreases, causing the total current $I_{SUM}$ at summing node CS to remain approximately constant. At time 4, $V_{RAC}$ reaches a level that causes current $I_{TAP2}$ to increase to the point where current $I_{TAP1}$ is zero. At this point, the first current sink 100 falls out of regulation, and $V_{CS}$ rises above $V_{REF1}$ causing the first current sink 100 to shut off. At time 5, $V_{RAC}$ rises to a level where the second current sink 105 begins regulating, and $V_{CS}$ and $V_{REF2}$ are in approximate equilibrium. The process then repeats for the third and fourth current sinks 110 and 115 as input voltage $V_{RAC}$ rises further, and also operates in reverse as $V_{RAC}$ passes the peak and starts decreasing.

Figure 4:
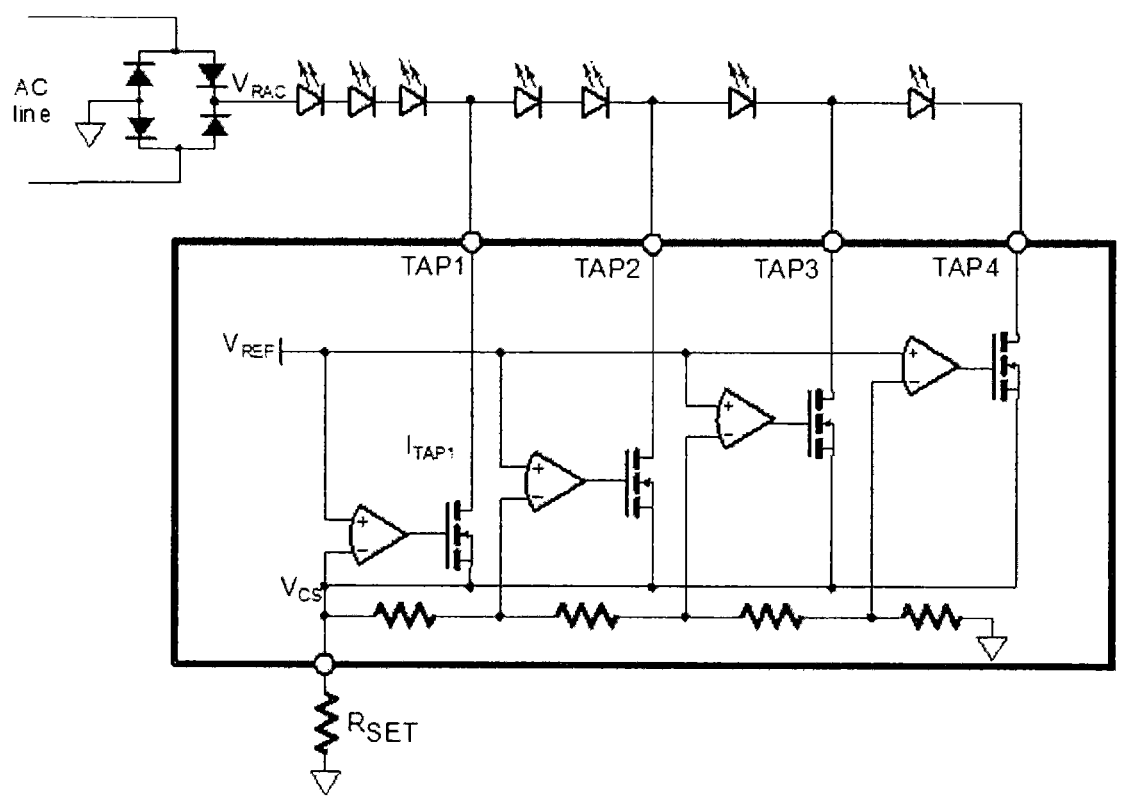
FIG. 4 illustrates a sequential linear LED driver circuit according to another exemplary embodiment.

FIG. 4 depicts a sequential linear LED driver circuit according to another exemplary embodiment. The circuit of FIG. 4 is similar to the circuit of FIG. 2, except that the reference input of each control amplifier 101, 106, 111, and 116 is connected to the same reference voltage $V_{REF}$, as opposed to differing voltages created by resistive voltage divider 120. In the circuit of FIG. 4, the feedback is attenuated, as the feedback input of each control amplifier 101, 106, 111, and 116 is connected to a different point in a resistive voltage divider. One end of the resistive voltage divider is connected to the summing node CS, to which the feedback input of the first current sink 100 is connected, while the other end of the resistive voltage divider is connected to ground.

Figure 5:
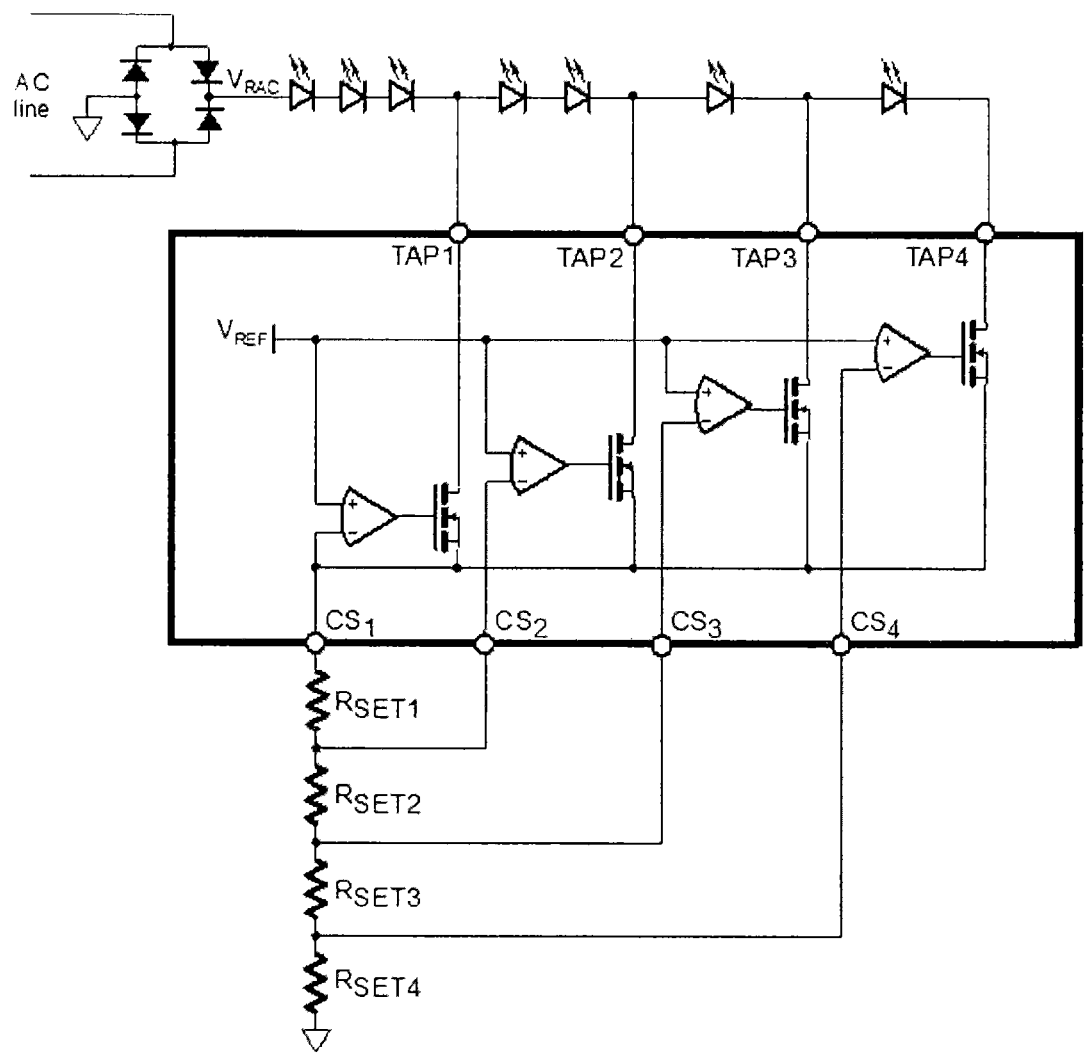
FIG. 5 illustrates a sequential linear LED driver circuit according to yet another exemplary embodiment.

FIG. 5 depicts a sequential linear LED driver circuit according to yet another exemplary embodiment. In the exemplary embodiment of FIG. 5, the circuit is similar to the circuit of FIG. 2, except that the feedback divider is combined with resistor $R_{SET}$. The circuit of the exemplary embodiment shown in FIG. 5 includes four resistors $R_{SET1}$, $R_{SET2}$, $R_{SET3}$, and $R_{SET4}$. The feedback input of control amplifier 101 is connected to $R_{SET1}$, the feedback input of control amplifier 106 is connected between $R_{SET1}$ and $R_{SET2}$, the feedback input of control amplifier 111 is connected between $R_{SET2}$ and $R_{SET3}$, and the feedback input of control amplifier 116 is connected between $R_{SET3}$ and $R_{SET4}$. Although current sense points $CS_1$, $CS_2$, $CS_3$, and $CS_4$ are different for each current sink, all tap currents are summed at a summing node.

Although the inventive concepts of the present disclosure have been described and illustrated with respect to exemplary embodiments thereof, it is not limited to the exemplary embodiments disclosed herein and modifications may be made therein without departing from the scope of the inventive concepts.

What is claimed is:

1. A sequential linear LED driver circuit, comprising:
   a plurality of current sinks, wherein each of the plurality of current sinks is configured to be coupled to a light-emitting diode (LED) string or a tap located within said LED string; and
   a voltage divider that generates a plurality of reference voltages, wherein each of the plurality of reference voltages is applied to a respective current sink of the plurality of current sinks;
   wherein an output of each current sink of the plurality of current sinks are connected at a summing node;
   wherein each current sink comprises:
      a control amplifier having a reference terminal and a feedback terminal; and
      a field effect transistor (FET) having a gate terminal, a source terminal, and a drain terminal;
   wherein the reference terminal of each control amplifier is connected to a first reference voltage; and
   wherein the feedback terminal of each control amplifier is connected to one of the plurality of reference voltages.

2. The sequential LED driver circuit of claim 1, wherein an output of the control amplifier of each current sink is coupled to the gate terminal of the FET in the respective current sink.

3. The sequential LED driver circuit of claim 1, wherein the drain terminal of each FET is coupled to the LED string or a tap located within said LED string.

4. The sequential LED driver circuit of claim 1, wherein the source terminal of each FET is coupled to the summing node.

5. The sequential LED driver circuit of claim 1, wherein the feedback terminal of a first control amplifier of a first current sink is coupled to the summing node.

6. The sequential LED driver circuit of claim 1, wherein a first end of the voltage divider is coupled to the summing node, and a second end of the voltage divider is connected to ground.

7. The sequential LED driver circuit of claim 1, further comprising a resistor having a first end coupled to the summing node and a second end coupled to ground.

* * * * *